Nov. 25, 1947.    R. C. CHIRNSIDE ET AL    2,431,370
POWDERED ALUMINA
Filed Feb. 3, 1944
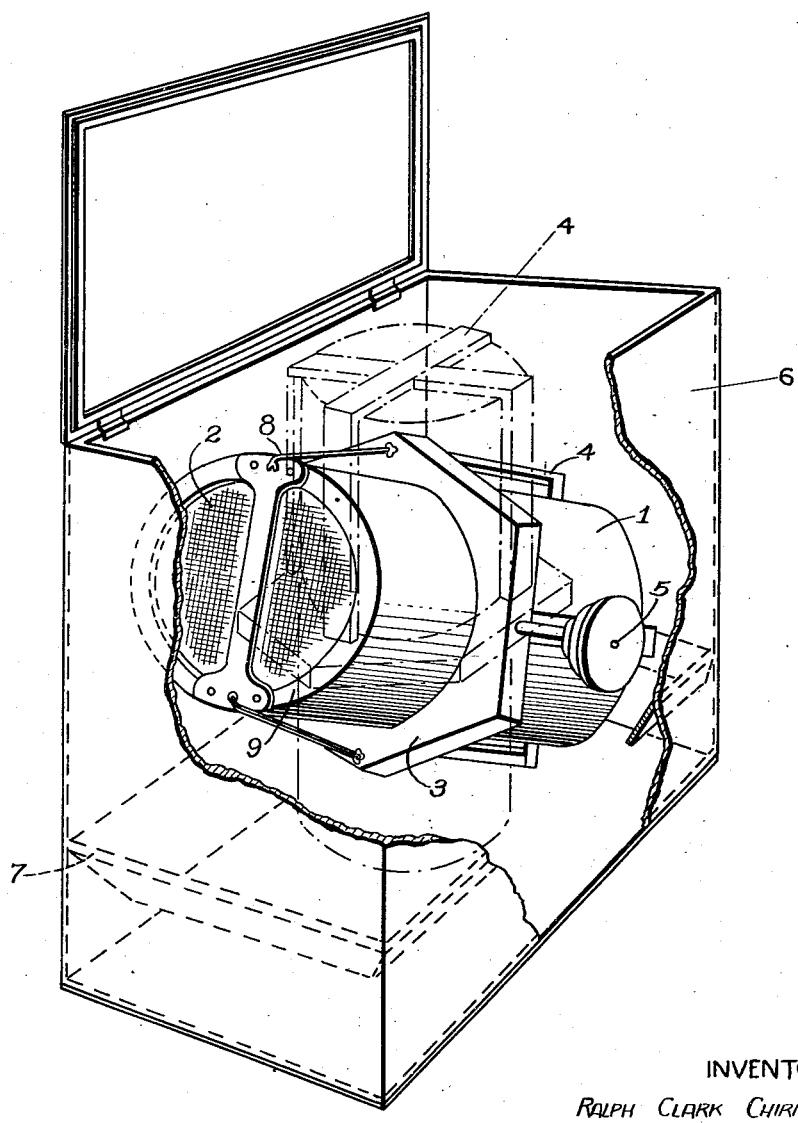
INVENTORS
RALPH CLARK CHIRNSIDE
AND
LEONARD ARTHUR DAUNCEY
BY
ATTORNEY Patented Nov. 25, 1947

2,431,370

UNITED STATES PATENT OFFICE 2,431,370

POWDERED ALUMINA

Ralph Clark Chirnside and Leonard Arthur Dauncey, Wembley, England, assignors to The General Electric Company Limited, London, England Application February 3, 1944, Serial No. 520,968
In Great Britain February 15, 1943

11 Claims. (Cl. 23—142)

This invention relates to the manufacture of powdered alumina. Its object is to produce very finely powdered alumina in a state in which it will flow almost freely like a liquid. One use of such alumina is in the making of artificial jewels in apparatus of the known kind in which accurately adjusted quantities of alumina (which may be mixed with a small amount of colouring matter) are projected down a narrow tube into an oxyhydrogen flame.

The term "freely flowing" cannot be defined closely in terms of measurable quantities. It implies that the powder, when shaken in a large bottle, splashes somewhat like a light liquid, and that it will flow under its own weight down a tube (say) 1 cm. in diameter; but a powder is not to be deemed not freely flowing, merely because tapping is required to cause it to flow down a narrower tube. For the purpose of this specification "freely flowing" may be taken to mean not substantially less freely flowing than powder prepared by the preferred method hereinafter described by way of example. Freely flowing alumina is necessarily of low bulk density, e. g. 0.3 gm./ml.

It is known that alumina of very low bulk density can be prepared by igniting a highly hydrated sulphate of aluminium, such as aluminium sulphate $Al_2(SO_4)_3.18H_2O$ or ammonium alum, $(NH_4)_2SO_4.Al_2(SO_4)_3.24H_2O$. The product thereby produced is coherent; it is not easy to break up the coherent mass without forming aggregates that prevent the product from flowing freely.

It has now been found that the desired result can be attained if two conditions are fulfilled. Firstly the ignition must take place at such a temperautre (e. g. 1000° C.) that the alumina is substantially all in the gamma form, and not in the alpha form produced at considerably higher temperatures. Secondly the mass must be broken up by its own weight and without causing denser bodies to impact on it.

According to the invention in its simplest aspect, a method of manufacturing freely flowing alumina comprises the steps of (1) igniting a highly hydrated sulphate of aluminium at a temperature at which substantially only gamma alumina is produced by the ignition, and (2) tumbling the product of step 1 in a vessel containing substantially no other loose solid material.

In the preferred method of manufacture, described by way of example, the starting material is either ammonium alum or a mixture of aluminium sulphate, ammonium sulphate and water in the proportion

$Al_2(SO_4)_3.18H_2O : (NH_4)_2SO_4.6H_2O$

If an artificial ruby is required, enough chromium sulphate to produce (say) 5% $Cr_2O_3$ in the ignited product may be added to the starting materials. The alum or mixture contained in a silica boat is ignited at 1000° C. in air in a muffle until the conversion to alumina is complete, but no longer.

After ignition about 400 gm. of the coherent product is tumbled in the apparatus illustrated in the accompanying drawing. Here 1 is a cardboard cylinder about 35 cm. long and 25 cm. in diameter, closed at each end by a fine screen 2, e. g. of woven silk, and supported by a board 3 to one side of which is attached a frame 4. This structure is rotated at about 25 R. P. M. about an axis 5 perpendicular to the axis of the cylinder and passing through its centre. The cylinder is contained in a wooden casing 6; as the powder resulting from the tumbling passes through the screens, it falls into the hopper 7 and is eventually taken out through an opening not shown. 8 is a spring holding a lid 9 which forms one end of the cylinder and allows material to be introduced into it.

Departures may be made from the above-described method in many details without introducing material change; thus more water can be added to the mixed sulphates, or water can be added to the alum; but no advantage is known in such addition and extra heat is required to drive the water off. Again the dimensions of the tumbling cylinder can be varied within wide limits if the charge is altered correspondingly. But the speed of rotation should not be increased so greatly that centrifugal forces exceed gravity. Lastly, as has been said, the ammonium sulphate may be omitted from the mixture and aluminium sulphate alone used; but the alum or the mixture appears to be preferable if the most freely flowing product is required.

We claim:

1. The method of manufacturing a freely flowing powder consisting mainly of hygroscopic gamma alumina that comprises the steps of (1) heating for ignition a material consisting essentially of a highly hydrated sulphate of aluminium at a temperature at which substantially only gamma alumina is produced by the ignition, (2) stopping the heating after the ignition of all said material is completed, and (3) then tumbling the product of step 1 in the presence of substantially no other loose solid material than that resulting from step 1.

2. The method of manufacturing a freely flowing powder consisting mainly of hygroscopic gamma alumina that comprises the steps of (1) heating for ignition a material consisting essentially of ammonium alum at a temperature at which substantially only gamma alumina is produced by the ignition, (2) stopping the heating after the ignition of all said material is completed, and (3) then tumbling the product of step 1 in the presence of substantially no other loose solid material than that resulting from step 1.

3. The method of manufacturing a freely flowing powder consisting mainly of hygroscopic gamma alumina that comprises the steps of (1) heating for ignition a material consisting essentially of aluminium sulphate $Al_2(SO_4)_3.18H_2O$ mixed with ammonium sulphate $$(NH_4)_2SO_4.6H_2O$$

at a temperature at which substantially only gamma alumina is produced by the ignition, (2) stopping the heating after the ignition of all said material is completed, and (3) then tumbling the product of step 1 in the presence of substantially no other loose solid material than that resulting from step 1.

4. The method of manufacturing a freely flowing powder consisting mainly of hygroscopic gamma alumina that comprises the steps of (1) heating for ignition a material consisting essentially of a highly hydrated sulphate of aluminium at a temperature at which only gamma alumina is produced by the ignition, said material having mixed therewith a small proportion of a compound of at least one metal which leads to colouration of the product obtained by melting the product of the method set forth herein, (2) stopping the heating after the ignition of all said material is completed, and (3) then tumbling the product of step 1 in the presence of substantially no other loose solid material than that resulting from step 1.

5. The method of manufacturing a freely flowing powder consisting mainly of hygroscopic gamma alumina that comprises the steps of (1) heating for ignition a material consisting essentially of a highly hydrated sulphate of aluminium at a temperature at which substantially only gamma alumina is produced by the ignition, (2) stopping the heating after the ignition of all said material is completed, and (3) then simultaneously tumbling and sifting the product of step 1 in the presence of substantially no other loose solid material than that resulting from step 1.

6. The method of manufacturing a freely flowing powder consisting mainly of hygroscopic gamma alumina that comprises the steps of (1) heating for ignition a material consisting essentially of a highly hydrated sulphate of aluminium at a temperature at which substantially only gamma alumina is produced by the ignition, (2) stopping the heating after the ignition of all said material is completed, and (3) then tumbling the product of step 1 in the presence of substantially no other loose solid material than that resulting from step 1, the tumbling being carried out in a container at least a part of the walls of which constitute a sieve so that the powder produced by the tumbling falls through the sieve while the tumbling is in progress.

7. The method of manufacturing a freely-flowing powder consisting mainly of hygroscopic gamma alumina that comprises the steps of (1) heating for ignition at a temperature of 1000° C. a material consisting essentially of a mixture of aluminium sulphate $Al_2(SO_4)_3.18H_2O$ and ammonium sulphate $(NH_4)_2SO_4.6H_2O$, to which mixture is added substantially 5% of chromium sulphate, (2) stopping the heating after the ignition of all said material is completed, and (3) then simultaneously tumbling and sifting the product of step 1 in the presence of substantially no other loose solid material than that resulting from step 1.

8. The method of manufacturing a freely flowing powder consisting mainly of hygroscopic gamma alumina that comprises the steps of (1) heating for ignition a mass consisting essentially of a material selected from the group consisting of a highly hydrated sulphate of aluminium, ammonium alum, a mixture of hydrated aluminium sulphate and hydrated ammonium sulphate and a mixture of aluminium sulphate, ammonium sulphate and water, carrying out the heating for ignition at a temperature at which substantially only gamma alumina is produced by the ignition, (2) stopping the heating after the ignition of all said material is completed, and (3) then tumbling the product of step 1 in the presence of substantially no other loose solid material.

9. The method of manufacturing a freely flowing powder consisting mainly of hygroscopic gamma alumina that comprises the steps of (1) heating for ignition a mass consisting essentially of a material selected from the group consisting of a highly hydrated sulphate of aluminium, ammonium alum, a mixture of hydrated aluminium sulphate and hydrated ammonium sulphate and a mixture of aluminium sulphate, ammonium sulphate and water, carrying out the heating for ignition at a temperature of about 1,000° C. at which substantially only gamma alumina is produced by the ignition, (2) stopping the heating after the ignition of all said material is completed, and (3) then tumbling the product of step 1 in the presence of substantially no other loose solid material.

10. The method of manufacturing a freely flowing powder consisting mainly of hygroscopic gamma alumina that comprises the steps of (1) heating for ignition a mass consisting essentially of a material selected from the group consisting of a highly hydrated sulphate of aluminium, ammonium alum, a mixture of hydrated aluminium sulphate and hydrated ammonium sulphate and a mixture of aluminium sulphate, ammonium sulphate and water, said mass having mixed therein a small proportion of a compound of at least one metal which leads to colouration of the product obtained by melting the product of the method set forth herein, carrying out the heating for ignition at a temperature of about 1,000° C. at which substantially only gamma alumina is produced by the ignition, (2) stopping the heating after the ignition of all said material is completed, and (3) then tumbling the product of step 1 in the presence of substantially no other loose solid material than that resulting from step (1).

11. The method of manufacturing a freely flowing powder consisting mainly of hygroscopic gamma alumina that comprises the steps of (1) heating for ignition a mass consisting essentially of a material selected from the group consisting of a highly hydrated sulphate of aluminium, ammonium alum, a mixture of hydrated aluminium sulphate and hydrated ammonium sulphate, and a mixture of aluminium sulphate, ammonium sulphate and water, carrying out the heating for ignition at a temperature at which substantially only gamma alumina is produced by the ignition, (2) stopping the heating after the ignition of all said material is completed, and (3) then simultaneously tumbling and sifting the product of step 1 in the presence of substantially no other loose solid material.

RALPH CLARK CHIRNSIDE.
LEONARD ARTHUR DAUNCEY.

REFERENCES CITED

The following references are of record in the file of this patent:

UNITED STATES PATENTS

| Number | Name | Date |
| --- | --- | --- |
| 1,567,610 | Moldenke | Dec. 29, 1925 |
| 1,957,767 | Fleischer | May 8, 1934 |
| 2,074,162 | Bowman | Mar. 16, 1937 |
| 2,236,514 | Burk et al. | Apr. 1, 1941 |

FOREIGN PATENTS

| Number | Country | Date |
| --- | --- | --- |
| 504,899 | Great Britain | May 2, 1939 |

OTHER REFERENCES

Jellinek, "X-ray Diffraction Examination of Gamma Alumina," Industrial and Engineering Chemistry, volume 37, page 158, (1945).

Fricke, "Chemical Abstracts," volume 32, page 2011, (1938).